US011379517B2

(12) United States Patent
Kelly

(10) Patent No.: US 11,379,517 B2
(45) Date of Patent: Jul. 5, 2022

(54) PHOTOGRAPHY SEARCHING SYSTEM

(71) Applicant: Griffin Edward Kelly, Chicago, IL (US)

(72) Inventor: Griffin Edward Kelly, Chicago, IL (US)

(73) Assignee: Griffin Kelly, Chicago, IL (US)

(*) Notice: Subject to any disclaimer, the term of this patent is extended or adjusted under 35 U.S.C. 154(b) by 51 days.

(21) Appl. No.: 16/251,057

(22) Filed: Jan. 17, 2019

(65) Prior Publication Data
US 2019/0251120 A1 Aug. 15, 2019

Related U.S. Application Data

(60) Provisional application No. 62/619,778, filed on Jan. 20, 2018.

(51) Int. Cl.
G06F 16/587 (2019.01)
G06F 16/54 (2019.01)
G06F 16/51 (2019.01)
G06F 16/583 (2019.01)
A63B 24/00 (2006.01)

(52) U.S. Cl.
CPC .......... G06F 16/587 (2019.01); G06F 16/51 (2019.01); G06F 16/54 (2019.01); G06F 16/5838 (2019.01); A63B 24/0084 (2013.01)

(58) Field of Classification Search
CPC .... G06F 16/5838; G06F 16/587; G06F 16/51; G06F 16/54; A63B 24/0084
USPC ...................................................... 707/722
See application file for complete search history.

(56) References Cited

U.S. PATENT DOCUMENTS

| 6,985,875 | B1* | 1/2006 | Wolf | G06Q 10/00 |
| | | | | 348/157 |
| 7,876,352 | B2* | 1/2011 | Martin | G06Q 50/01 |
| | | | | 348/157 |
| 8,442,922 | B2* | 5/2013 | Martin | G06Q 50/01 |
| | | | | 705/319 |
| 9,418,482 | B1* | 8/2016 | Yang | G06T 19/006 |
| 9,928,447 | B2* | 3/2018 | Koren | G06K 9/6284 |
| 10,002,370 | B2* | 6/2018 | Ahn | G06F 16/51 |
| 11,263,461 | B2* | 3/2022 | Marty | H04N 7/183 |
| 2010/0134614 | A1* | 6/2010 | Aman | A63B 24/0003 |
| | | | | 348/135 |
| 2010/0158315 | A1* | 6/2010 | Martin | G06F 16/58 |
| | | | | 382/103 |

(Continued)

Primary Examiner — Sheree N Brown

(57) ABSTRACT

A photography searching system that is used to organize, share, and/or output event photography for event participants. Best used for races or large events, the system helps to organize photographs using associated available data such as date, time, or location of where the photograph was taken, the name of an event participant, a number corresponding to a number worn by the event participant (bib number or participant number), a color corresponding to a clothing color worn by the event participant, as well as the net time it takes participants to complete a event, etc., also known as data search terms. A photographer will upload these photographs to the system, they will be sorted and categorized in the database, and as in most events, each event participant will have multiple photographs taken of them. This system presents an interface on which a user inputs at least one query parameter and relevant photos are then presented to them.

14 Claims, 1 Drawing Sheet

(56) References Cited

U.S. PATENT DOCUMENTS

| | | | |
|---|---|---|---|
| 2011/0251972 A1* | 10/2011 | Martin | G06F 16/58 |
| | | | 705/319 |
| 2013/0265396 A1* | 10/2013 | Surma | H04N 13/239 |
| | | | 348/47 |
| 2017/0330247 A1* | 11/2017 | Ahn | G06F 40/106 |
| 2018/0020243 A1* | 1/2018 | Ni | G11B 27/031 |
| 2018/0084310 A1* | 3/2018 | Katz | G06Q 30/0242 |
| 2019/0221001 A1* | 7/2019 | Dassa | H04L 67/02 |

* cited by examiner

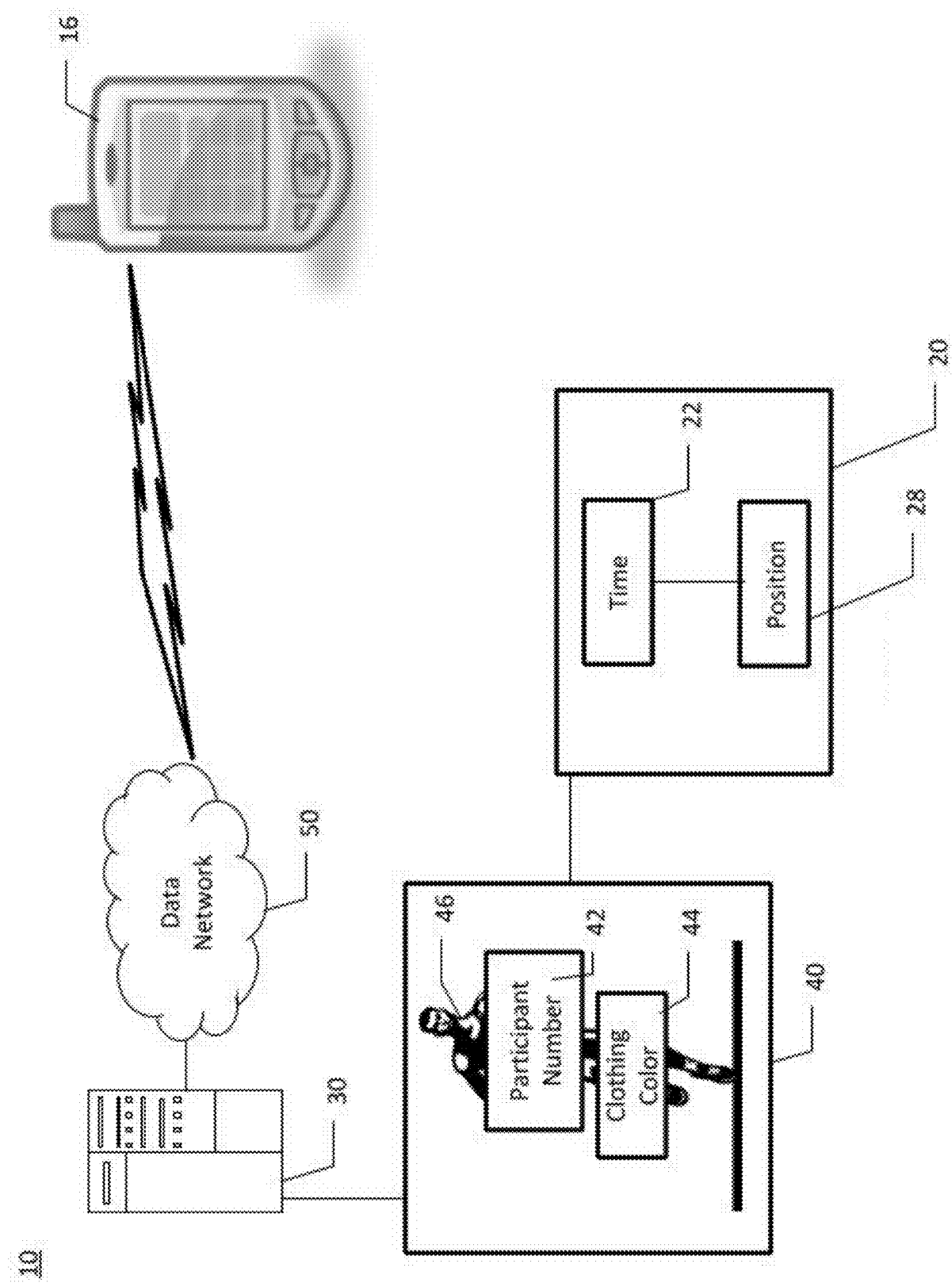

PHOTOGRAPHY SEARCHING SYSTEM

BACKGROUND

The subject matter of the present specification relates to the art of event photography searching systems. Exemplary embodiments disclosed herein find particular application in conjunction with footraces, and they will be described herein with particular reference thereto. However, it is to be appreciated that various exemplary embodiments such as those disclosed herein are also amenable to other like applications and/or other types of races, e.g., such as bicycle races, wheelchair races, horse races, etc as well as large scale events with numerous participants.

Systems have been developed which use databases to store participant information and associate it with specific photography making photography easier to find. See the following, for example, all of which are incorporated herein by reference in their entirety:

U.S. patent application Publications, Publication Nos.:
U.S. Pat. Nos. 7,047,214; 6,985,875; 6,819,783

However, many prior art photography searching systems have exhibited some form of flaw, drawback, limitation and/or other undesirable characteristic.

Accordingly, a new and/or improved photography searching system, system and/or apparatus is disclosed herein.

BRIEF DESCRIPTION

This Brief Description is provided to introduce concepts related to the present inventive subject matter. It is not intended to identify essential features of the claimed subject matter nor is it intended for use in determining or limiting the scope of the claimed subject matter. The exemplary embodiments described below are not intended to be exhaustive or to limit the invention to the precise forms disclosed in the following Detailed Description. Rather, the embodiments are chosen and described so that others skilled in the art may appreciate and understand the principles and practices of the present inventive subject matter.

In accordance with one aspect of the present inventive subject matter, a photography searching system as essentially described herein is provided.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and/or other embodiments, are given by way of illustration and not limitation. Many changes and modifications within the scope of the present invention may be made without departing from the spirit thereof, and the invention includes all such modifications.

BRIEF DESCRIPTION OF THE DRAWINGS

The following Detailed Description makes reference to the FIGURES in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

FIG. 1 is a diagrammatic illustration showing an exemplary photography searching system in accordance with aspects of the present inventive subject matter.

DETAILED DESCRIPTION

For clarity and simplicity, the present specification shall refer to structural and/or functional elements, relevant standards, algorithms and/or protocols, and other components, algorithms, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the FIGURES. Unless otherwise specified, like numbers in the FIGURES indicate references to the same, similar or corresponding elements throughout the FIGURES. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the FIGURES.

In general, there is disclosed herein a photography searching system that is used to organize, share and/or output event photography and/or other data for one or more event participants. For example, these photographs may include and/or be associated with data such as date and time and position of the photograph taken, the name of an event participant, a number corresponding to a number worn by the event participant (bib number or participant number), a color corresponding to a clothing color worn by the event participant, as well as the net time it takes participants to complete a event, etc., also known as data search terms. Suitably, in practice, each event participant has multiple photographs taken of them during the course of the event. Suitably, each photograph has unique data encoded that corresponds to an event participant which is ultimately stored in the system. As each photo is processed, these unique identifiers, such as time, position, clothing color, event number, etc. are read out of the image and associated into a database. Based on the datetime, location, clothing color, and/or participant number and name, the system organizes photographs and/or otherwise filters the photograph most relevant to the search terms as selected by the event participant. For each of these data search terms, they may be used to search and filter the number of photographs shown to the event participant, singularly, using only one individual data search term, or compounded, using multiple data search terms together. It can be appreciated that a photograph can be associated with relevant data search terms for two or more unique individuals.

In practice, a photograph can be associated with one or more event participants as multiple bib numbers or participant numbers can be contained within a photograph. Each participant number can be found either by manual human inspection and then manually keyed into the photograph's metadata, or alternatively keyed manually into the photography searching system as an associated field or model of the photograph. In a preferred embodiment, machine learning techniques, specifically neural networks can be used to quickly associate participant numbers to photographs.

In one suitable embodiment, photography position data may include GPS (Global Positioning System) data, including or alternatively, latitude and longitude data, as associated with the photo. Photography position data may more generally reference a landmark the photograph was taken near, e.g., near the statue, at the finish, at the start. This position metadata may be encoded by the capturing device such as a phone or camera, or entered into the metadata later by a post processing software by the user. This metadata is then read in to the database by software, or manually keyed in by a user.

In practice, date and time metadata is encoded within the photo indicating when the photograph was captured. It can reference any method of recording digital time such as a unix timestamp, time the photograph was taken in local time adjusted for timezone, or UTC time, all of which can be queried through the database. Similarly to position metadata, datetime metadata may be encoded by the capturing device or entered into the metadata by software. This metadata can then be entered into the database by software on the server or manually related to a photo by being manually entered into the database.

In one embodiment, event results which include at least participant number and/or name and finishing time allow the ability for event participants to search for relevant photography using finishing time, net time, gun time, or elapsed time when uploaded to the system. Photographs can be associated within the system using known parameters, both within the photo and event results, such as participant number, and then be transitively associated to the other data such as finish time. It can be appreciated that more event participant information in event results would allow for a larger number of data points to be transitively associated such as participant first or last name.

In one embodiment, color data corresponding to a clothing color worn by the event participant may reference colors worn generally on the top half of the body, e.g. a shirt, sweater, etc. They may be stored in the database generally as a color description, e.g. blue, green, etc., or more specifically to reference a (HEX) hexadecimal, RGB (Red Green Blue), CMYK (Cyan Magenta Yellow Black), or Pantone color. In one exemplary embodiment, each color corresponding to an item of clothing is referenced in terms of its proximity of the body and to its color, e.g. blue head, green torso, gray legs, etc. Color and body location of a object of clothing can be correlated through machine learning software such as pattern recognition, support vector machines (SVMs), or neural networks. Color can more simply be found by scanning the entire photo for specific hues. Alternatively, these parameters can be manually associated in the database by human observation or saved to the photograph's metadata. Respectively, the same methods that are used to associate position and datetime to a photograph's metadata and subsequently stored in a database can be used with regard to color.

With reference now to FIG. 1, there is shown an exemplary photography searching system 10. The system 10 includes one photography capturing device such as a camera or smartphone 16 to capture photography of an event participant 46. Each photo is encoded with visual data such as participant number 42 or clothing color 44 and photography metadata such as position data 28 and time data 22. The camera 16 can then upload photos through the Internet or other data network 50. In practice, the wireless telecommunication network 50 may be a cellular or mobile or other like network, e.g., such as a GSM (Global System for Mobile Communications) network, a UTMS (Universal Mobile Telecommunications System) network, an 4G LTE (Long-Term Evolution) or 5G network. These photos are then sorted and stored in a server or other database 30 by the visual data 40 and metadata 20. In practice, the metadata 20 may be exchangeable image file format, Exif, or other like metadata format that includes relevant data such as e.g., position data 28, time data 22, longitude and latitude data, photograph exposure data, color correction data, editing data, as well as other relevant metadata. When the event participant 48 or other individual wants to find a specific photograph 40, they can then query database 30 through the data network 50 through their own PC (personal computer) or smartphone and search through both visual data within photograph 40 as well as metadata 20. A search or filter can be applied by all using all encodings and compounded together, position 28, time 22, participant number 42, and clothing color 44, or individually with no secondary search parameter.

It can be appreciated that the presence of multiple query parameters eliminates the need for high accuracy in any single query parameter. While previous prior art methods require the participant number 42 to be accurately identified and stored in database 30, our improved photography searching system may filer, through compound searching, with position data 28, time data 22, and clothing color data 44, to the same photographs that would be found by a single query over participant numbers 42. It should also be noted that, for photographs 40 where there is incomplete or partially obscured participant numbers 42, that partial matching of participant number could be compounded with other data to find photographs that the event participant 46 is looking for.

In one such embodiment, the database and server 30 are locally hosted, and on premise, requiring no access to a data network 50. The photograph capturing device 16 can then connect directly to the database and server 30, and the participant 46 can then query the database and server 30 directly as well.

It is also to be appreciated that any one or more of the particular tasks, steps, processes, methods, functions, elements and/or components described herein may suitably be implemented via hardware, software, firmware or a combination thereof. In particular, the server 30 and/or user devices 16 may be embodied by processors, electrical circuits, computers and/or other electronic data processing devices that are configured and/or otherwise provisioned to perform one or more of the tasks, steps, processes, methods and/or functions described herein. For example, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods, functions and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A computer implemented method for providing a subset of images to a user from a collection of images to match a user-inputted query, in which the images are of athletes in a race or athletic event, comprising:
   (i) storing a plurality at images in a database;
   (ii) analyzing, via a computing device, all images stored in the database individually, using one or more machine learning models, wherein the models use support vector machines for pattern recognition on said image, to scan and detect color and hue values, as well as any athlete numbers within the image;
   (iii) saving the detected color and hue values and athlete number information found in said image in a database;
   (iv) collecting a query from a user using a graphical user interface, wherein the query includes at least the parameter of an athlete number which is two or more digits in length;
   (v) identifying and retrieving a first set of images that match the user query;
   (vi) presenting, via a computing device, said first set of images on the graphical user interface;
   (vii) identifying and retrieving a second set of images in which the athlete number may have been obscured, unrecognized, or missing in the image by querying the database
   (viii) analyzing, via a computing device, said second set of images and filtering images within said second set which have a partial match or permutation to the athletic number query to produce a subset of images, sorting and categorizing by those images most similar to a high confidence match of the athletic number query as well as color and hue values; and
   (ix) presenting, via a computing device, said subset of the second set of images alongside said first set of images on the graphical user interface.

2. The method of claim 1, wherein analyzing said second set of images further comprises:
   sorting and categorizing images most similar to the athletic number query using edit distance or Levenshtein distance.

3. The method of claim 2, wherein the query additionally includes at least the parameter of color of clothing,
   and wherein analyzing said second set of images further comprises:
   using one or more machine learning models to narrow the subset of images to those which match the query parameter color of clothing.

4. The method of claim 3, wherein the query parameter color of clothing is associated with an anatomical location, and wherein analyzing said second set of images further comprises:
   using one or more machine learning models to narrow the subset of images to those which matches the query parameter color of clothing associated with an anatomical location.

5. The method of claim 4, wherein the query further includes a second parameter of color of clothing associated with a second anatomical location, and wherein analyzing said second set of images further comprises:
   using one or more machine learning models to narrow the subset of images to those which match one, or both of the first parameter of color of clothing associated with a first anatomical location and the second parameter of color of clothing associated with a second anatomical location.

6. The method of claim 4, wherein storing a plurality of images in a database further comprises:
   associating said images by athlete number to an elapsed net time, gun time, first name or last name.

7. The method of claim 4, wherein the query includes at least an additional parameter selected from the group consisting of image metadata, location where the photo was taken, datetime, or participant data,
   and wherein analyzing said second set of images further comprises:
   using one or more machine learning models to narrow the subset of images to those which match the respective additional query parameter.

8. The method of claim 7 wherein the additional parameter is image metadata in the form of Exchangeable image file format (Exif) data of the photo.

9. The method of claim 7, wherein the additional parameter is location where the image is taken is determined by Global Positioning System (GPS) coordinates.

10. The method of claim 7 in which the additional parameter is participant data consisting of the participant's first or last name.

11. The method of claim 6, wherein the query includes at least an additional parameter of elapsed net time, gun time, or datetime,
   and wherein analyzing said second set of images further comprises:
   using one or more machine learning models to narrow the subset of images to those which match the respective additional query parameter.

12. The method of claim 1 in which the race consists of biking, triathlons, skiing, running, or swimming.

13. The method of claim 1, in which the database server is located remotely.

14. The method of claim 1, wherein the database server is located on premises.

\* \* \* \* \*